(12) United States Patent
Kano

(10) Patent No.: US 10,248,649 B2
(45) Date of Patent: Apr. 2, 2019

(54) NATURAL LANGUAGE PROCESSING APPARATUS AND A NATURAL LANGUAGE PROCESSING METHOD

(71) Applicant: KAI Inc., Shizuoka (JP)

(72) Inventor: Yoshinobu Kano, Shizuoka (JP)

(73) Assignee: KAI INC., Shizuoka (JP)

( * ) Notice: Subject to any disclaimer, the term of this patent is extended or adjusted under 35 U.S.C. 154(b) by 0 days.

(21) Appl. No.: 15/780,272

(22) PCT Filed: Dec. 5, 2016

(86) PCT No.: PCT/JP2016/086042
§ 371 (c)(1),
(2) Date: May 31, 2018

(87) PCT Pub. No.: WO2017/094913
PCT Pub. Date: Jun. 8, 2017

(65) Prior Publication Data
US 2018/0365224 A1   Dec. 20, 2018

(30) Foreign Application Priority Data
Dec. 3, 2015  (JP) .................. 2015-236446

(51) Int. Cl.
*G06F 17/27*  (2006.01)
*G10L 13/04*  (2013.01)

(52) U.S. Cl.
CPC ........ *G06F 17/2785* (2013.01); *G06F 17/271* (2013.01); *G06F 17/274* (2013.01); *G10L 13/043* (2013.01)

(58) Field of Classification Search
CPC .. G06F 17/271; G06F 17/274; G06F 17/2755; G06F 17/277; G06F 17/2872;
(Continued)

(56) References Cited

U.S. PATENT DOCUMENTS 4,777,600 A * 10/1988 Saito ................ G06F 3/018
                                              704/235
4,864,502 A *  9/1989 Kucera ............. G06F 17/274
                                              704/8
(Continued)

FOREIGN PATENT DOCUMENTS

JP       07141469        6/1995
JP       08161175        6/1996
(Continued)

OTHER PUBLICATIONS

International Search Report dated Feb. 7, 2017 filed in PCT/JP2016/086042.
(Continued)

*Primary Examiner* — Vijay B Chawan
(74) *Attorney, Agent, or Firm* — Rankin, Hill & Clark LLP

(57) ABSTRACT

A natural language processing apparatus is provided with: a dialog processing unit which, every time an analyzable unit of a part of a natural language sentence is inputted, performs analysis processing with respect to the input unit in each of a plurality of analysis processing units in an incremental and parallel manner; and an output unit which obtains an output, such as a dialog response sentence, based on an analysis result from each analysis processing unit in the dialog processing unit. Each of processing units prepared in the dialog processing unit acquires an immediately preceding or an earlier past analysis result from the processing unit, and an immediately preceding or an earlier past analysis results from the other processing units, and obtains one or a limited number of analysis results while making an estimation with reference to the acquired analysis results.

16 Claims, 9 Drawing Sheets

(58) Field of Classification Search
CPC ............. G06F 17/2785; G06F 17/2795; G06F 17/2863; G06F 17/30616; G06F 17/30864
USPC ........ 704/9, 10, 2, 257, 270, 270.1, 251, 275
See application file for complete search history.

(56) References Cited

U.S. PATENT DOCUMENTS

| | | | | |
|---|---|---|---|---|
| 5,225,981 | A * | 7/1993 | Yokogawa | G06F 17/271 704/2 |
| 5,280,573 | A * | 1/1994 | Kuga | G06F 17/2795 715/223 |
| 5,299,124 | A * | 3/1994 | Fukumochi | G06F 17/271 704/2 |
| 5,371,674 | A * | 12/1994 | Obuchi | G06F 17/2872 704/2 |
| 5,424,947 | A * | 6/1995 | Nagao | G06F 17/271 704/10 |
| 5,442,780 | A * | 8/1995 | Takanashi | G06F 17/3043 |
| 5,500,796 | A * | 3/1996 | Black, Jr. | G06F 17/274 704/9 |
| 5,761,637 | A * | 6/1998 | Chino | G10L 15/1807 704/231 |
| 5,848,385 | A * | 12/1998 | Poznanski | G06F 17/271 704/4 |
| 5,873,076 | A * | 2/1999 | Barr | G06F 17/30864 704/270.1 |
| 5,890,103 | A * | 3/1999 | Carus | G06F 17/274 704/8 |
| 6,052,656 | A * | 4/2000 | Suda | G06F 17/274 704/9 |
| 6,098,035 | A * | 8/2000 | Yamamoto | G06F 17/2755 704/9 |
| 6,223,150 | B1 * | 4/2001 | Duan | G10L 15/26 704/277 |
| 6,243,669 | B1 * | 6/2001 | Horiguchi | G06F 17/271 704/257 |
| 6,282,507 | B1 * | 8/2001 | Horiguchi | G06F 17/271 345/171 |
| 6,336,029 | B1 * | 1/2002 | Ho | G09B 5/00 434/118 |
| 6,442,524 | B1 * | 8/2002 | Ecker | G06F 17/2755 704/257 |
| 2001/0029455 | A1 * | 10/2001 | Chin | G06F 17/273 704/277 |
| 2005/0131686 | A1 | 6/2005 | Yamamoto | |
| 2009/0248399 | A1 * | 10/2009 | Au | G06F 17/27 704/9 |
| 2011/0125496 | A1 | 5/2011 | Asakawa | |
| 2017/0169009 | A1 * | 6/2017 | Lim | G06F 17/2785 |

FOREIGN PATENT DOCUMENTS

| | | |
|---|---|---|
| JP | 2005182208 A2 | 7/2005 |
| JP | 2008003517 A2 | 1/2008 |
| JP | 2010211470 A2 | 9/2010 |
| JP | 2011107603 A2 | 6/2011 |
| JP | 2014149786 A2 | 8/2014 |

OTHER PUBLICATIONS

Yuka Kobayashi et al., "Development of Dialog Interface for Elderly People: Active Listening with Word Co-occurrence Analysis between Utterance Pairs", FIT2011 Dai 10 Kai Forum on Information Technology Koen Ronbunshu, (Aug. 22, 2011), vol. 2, pp. 253-256; Cited in ISR; Concise explanation of relevance.

Jun Suzuki et al., "Kakucho Lagrangian Kanwa o Mochiita Doji Shizen Gengo Kaisekiho", Proceedings of the 18th Annual Meeting of the Association for Natural Language Processing Tutorial Honkaigi, (Mar. 31, 2012), pp. 1284-1287; Cited in ISR; Concise explanation of relevance.

* cited by examiner

NATURAL LANGUAGE PROCESSING APPARATUS AND A NATURAL LANGUAGE PROCESSING METHOD

TECHNICAL FIELD

The present invention relates to a natural language processing apparatus and a natural language processing method suitable for conducting a dialog by analyzing a natural language, for example.

BACKGROUND ART

In recent years, natural language processing apparatuses have been developed in which a device incorporating a computer recognizes a natural language uttered by a human, and which automatically perform processing or provide a response based on the recognized content. For example, a natural language processing apparatus is being studied and developed which makes it possible for a humanoid robot to hold a "conversation" with humans. The humanoid robot is provided with a conversation system including a speech input unit such as a microphone; a speech recognition unit which recognizes a natural language sentence from an input speech; and a speech output unit which generates and outputs a response to the recognized natural language sentence.

Patent Document 1 describes an example of a language generating apparatus for processing natural language sentence. In the language generating apparatus of Patent Document 1, when a response sentence with respect to a certain problem is generated, a language expression sequence for describing the content of an action for solving the problem is generated at the point in time of finalization of the content.

CITATION LIST

Patent Literature

Patent Document 1: JP-A-8-161175

DISCLOSURE OF THE INVENTION

Problems to be Solved by the Invention

As noted above, robots and the like incorporating a computer capable of holding a conversation with a human has already been developed. However, the natural language processing capability based on the conventional computer cannot be considered very high. That is, in the conventional conversation system, expected conversational sentences are prepared in advance, and the system is only capable of holding conversations of limited content using the prepared conversational sentences. As a result, the conversations are far inferior to a conversation between humans.

With the language generating apparatus described in Patent Document 1, the accuracy of the response provided by the computer is improved to a certain extent over the conventional systems in that, when a response sentence is generated, a language expression sequence describing the content of an action for solving the problem is generated after the action is finalized.

However, that the response sentence is generated at the point in time of finalization of the content of the action for solving the problem means that the response sentence is not generated until the content of the action for solving the problem is finalized. This makes an extremely unnatural conversation for the human conversing with the computer; that is, the conversation feels far different from the conventional conversations between humans.

For example, in an actual conversation between humans, when an inquiry about the directions to a certain location is made, various exchanges, such as "Where should we meet?", "That route involves an inconvenient transfer", or "The weather looks bad, so why don't we go to another location?" can be expected during the course of the inquiry.

The question-response processing using the current computers is basically in question and answer style in which a response is made with respect to the immediately preceding question, without regard to context. In this case, the above-described various exchanges would lead to very unnatural responses from the viewpoint of the questioner. In addition, actual conversational sentences are not necessarily organized in accordance with the rules of Japanese grammar, and the computer may often fail to correctly understand the meaning of a conversational sentence. As a result, the problem exists of being unable to achieve an automatic dialog that feels like a dialog between humans.

An object of the present invention is to provide a natural language processing apparatus and a natural language processing method that make it possible to perform a dialog with a human in a human-like, natural, and appropriate manner.

Solutions to the Problems

A natural language processing apparatus according to the present invention analyzes an inputted natural language sentence and generates an output sentence for having a dialog with the inputted natural language sentence.

The natural language processing apparatus includes a dialog processing unit in which a plurality of analysis processing units for performing a different analysis for each element of the natural language sentence are prepared, wherein every time an analyzable unit of a part of the natural language sentence is inputted, each of the plurality of analysis processing units performs an analysis with respect to the input unit in an incremental and parallel manner. The dialog processing unit may include a sentence generation unit for obtaining a dialog response sentence based on an analysis result from each of the analysis processing units.

Each of the analysis processing units prepared in the dialog processing unit is configured to acquire an immediately preceding or an earlier analysis result from the analysis processing unit and an immediately preceding or an earlier analysis result from another analysis processing unit, and configured to obtain one or a limited number of analysis results with reference to the acquired analysis results. Based on the one or a limited number of analysis results from each of the analysis processing units in the dialog processing unit, a sentence generation unit which is one of the analysis processing units generates a dialog response sentence corresponding to the inputted natural language sentence, and outputs the dialog response sentence to an output unit.

A natural language processing method according to the present invention is configured to allow a natural language processing apparatus to analyze an inputted natural language sentence and generate an output sentence for having a dialog with the inputted natural language sentence.

The natural language processing method includes: an incremental analysis step of preparing analysis processing units having functions for performing a plurality of analysis processes for performing a different analysis for each element of the natural language sentence (hereafter referred to as "analysis processing functions"), and, every time an analyzable unit of a part of the natural language sentence is inputted, performing an analysis in an incremental and parallel manner with respect to the input unit in each of the plurality of analysis processing units; a sentence generation step of obtaining, based on each analysis result of the incremental analysis step in each of the analysis processing units, a dialog response sentence corresponding to the inputted natural language sentence in a sentence generation unit which is one of the analysis processing units; and an output step of outputting the dialog response sentence generated in the sentence generation unit to an output unit.

Each of the analysis processing units are configured to acquire an immediately preceding or an earlier analysis result from the analysis processing unit and an immediately preceding or an earlier analysis result from another analysis processing unit, and configured to obtain one or a limited number of analysis results with reference to the acquired analysis results.

Even in the case of a natural language sentence, particularly in the case of speech, sentence separation may not be clear. In the following, for sake of simplicity, when a "natural language sentence" is mentioned, a unit that can be generally called a sentence is contemplated.

According to the present invention, every time an analyzable unit of a natural language sentence is inputted, analysis processing is performed in an incremental and parallel manner by the analysis processing units prepared for the respective elements of analysis, and one or a limited number of analysis results are obtained from each analysis processing unit. Accordingly, natural language analysis processing similar to that in the case in which humans have a conversation while thinking can be performed.

Thus, according to the present invention, a conversation with a computer can be performed naturally as in the case of a conversation between humans.

In addition, each analysis unit in the system constructed to enable such natural conversation is capable of handling language in a more human-like manner than conventional tools, whereby higher performance can be obtained.

DESCRIPTION OF EMBODIMENTS

In the following, an example according to an embodiment of the present invention (hereafter referred to as "the present example") will be described with reference to the attached drawings.

1. Configuration Example of System as a Whole

Figure 1:
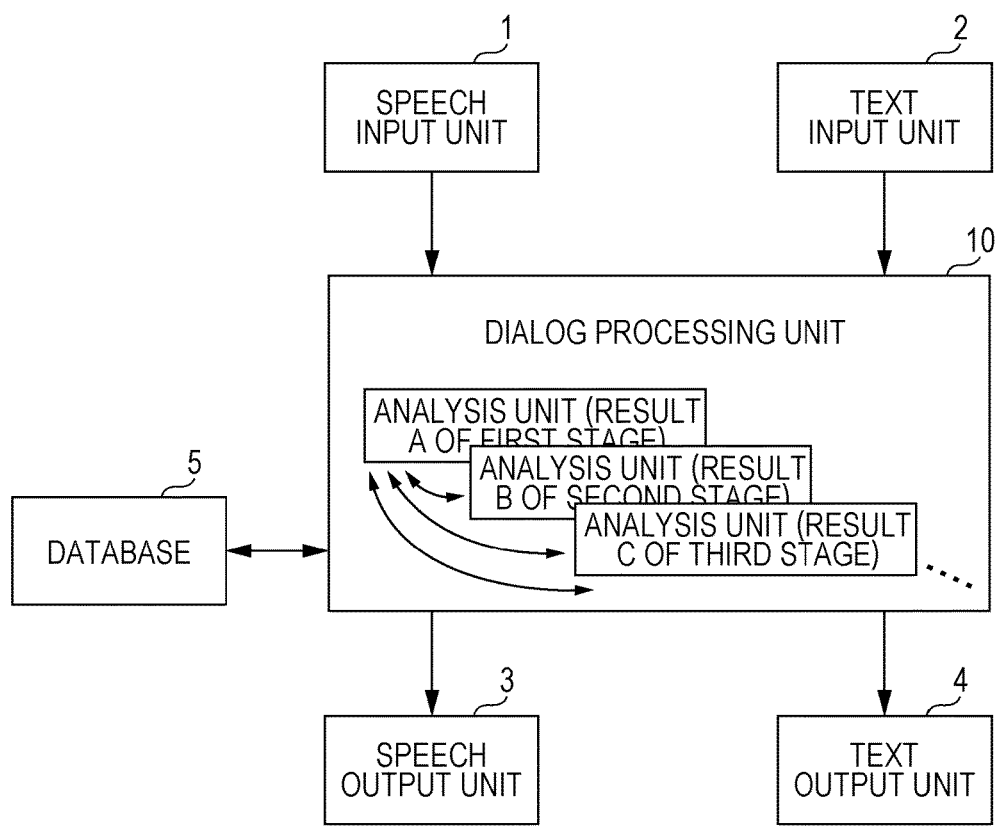
FIG. 1 is a configuration diagram illustrating an example of a natural language processing apparatus according to an embodiment of the present invention.

FIG. 1 illustrates an example of the overall configuration of a natural language processing apparatus of the present example.

The natural language processing apparatus of the present example includes a dialog processing unit 10. The dialog processing unit 10 is supplied with speech data inputted from a speech input unit 1, or text data inputted from a text input unit 2.

The dialog processing unit 10 is configured of a computer for performing data processing. The dialog processing unit 10 converts inputted speech data into text by means of a speech recognition processing, and performs analysis processing on the resultant text data. When the text data inputted from the text input unit 2 are processed, the dialog processing unit 10 subjects the inputted text data directly to the analysis processing while omitting the speech recognition processing.

The dialog processing unit 10 functions as an incremental analysis unit which performs analysis processing incrementally. That is, during the analysis processing, the dialog processing unit 10 performs analysis in an incremental and parallel manner every time an analyzable unit of a part of a natural language sentence is inputted.

Specifically, as illustrated in FIG. 1, for example, responsive to the input of an initial unit of a part of a natural language sentence, an initial analysis is performed in the analysis unit, and a result A is obtained. Thereafter, every time one unit of the natural language sentence is inputted, analysis units are formed for obtaining analysis results successively (incrementally), such as a result B, a result C, and so on, and analyses are performed by the analysis units thus formed. The analyzable unit may differ from one analysis unit to another.

Figure 2:
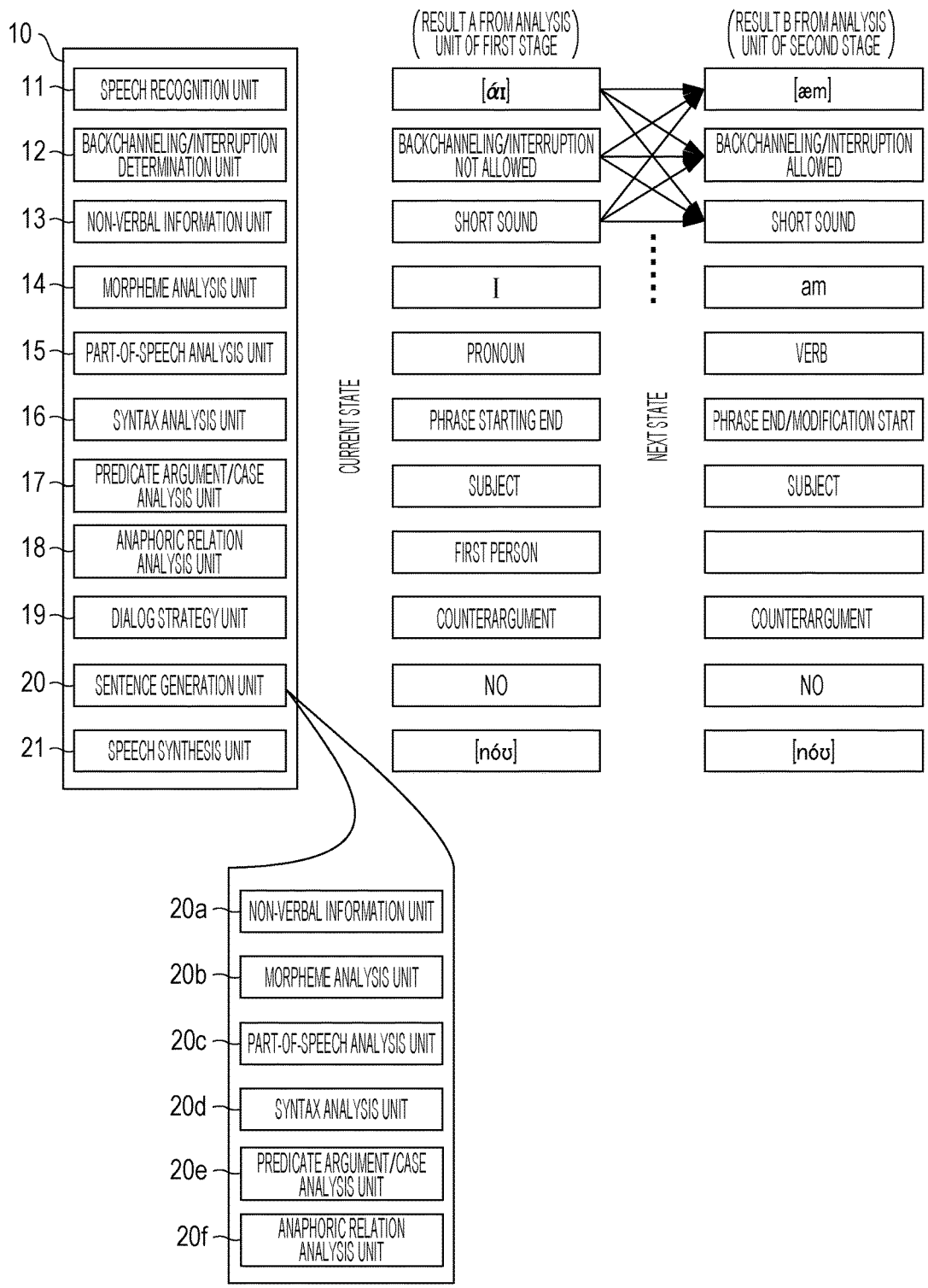
FIG. 2 is a configuration diagram illustrating the configuration of an incremental analysis unit and an example of processing thereby according to an embodiment of the present invention.

Each of the incrementally formed analysis units is provided with a plurality of analysis processing units with individual analysis functions, and analysis is performed by the plurality of analysis processing units in parallel. The details of the plurality of analysis processing units with which the dialog processing unit 10 is provided will be described later (FIG. 2).

Based on the analysis processing results, the dialog processing unit 10 generates a dialog sentence for performing a dialog with the natural language sentence, and subjects the generated dialog sentence to speech synthesis. Speech synthesis data of the dialog sentence obtained by the dialog processing unit 10 is supplied to the speech output unit 3. The speech output unit 3 outputs the dialog sentence in speech form at a timing determined by the dialog processing unit 10. The dialog processing unit 10 also supplies text data of the dialog sentence to the text output unit 4 for an output.

The dialog processing unit 10 is connected with a database 5 in which data necessary for natural language sentence analysis are accumulated. When analysis processing is performed, the data accumulated in the database 5 are referenced, as needed. The dialog processing unit 10 may be adapted to access an external server (not illustrated) and perform analysis processing by referring to the data accumulated in the server.

In the database 5 that is referenced when the dialog processing unit 10 performs analysis processing, entries of combinations of states of different analysis units, rather than a simple list of items, are stored, each with a confidence degree. The confidence degree is a value of confidence, indicated by the entry, of the analysis result at the time. The contents of the database 5 and the confidence degrees are constructed by training. The training processing involves allocating higher confidence degrees to patterns that have been seen in the past training processing. The details of the confidence degree will be described later.

In the example of FIG. 1, the configuration is provided with the speech input unit 1 and the text input unit 2 as input units, and with the speech output unit 3 and the text output unit 4 as output units. However, depending on the intended use of the natural language processing apparatus, the configuration may be provided with either a speech input unit and output unit, or a text input unit and output unit.

2. Configuration Example of Dialog Processing Unit

FIG. 2 illustrates an example of the configuration of the plurality of analysis processing units with which the dialog processing unit 10 is provided.

The dialog processing unit 10 is provided with a speech recognition unit 11; a backchanneling/interruption determination unit 12; a non-verbal information unit 13; a morpheme analysis unit 14, a part-of-speech analysis unit 15; a syntax analysis unit 16; a predicate argument/case analysis unit 17; an anaphoric relation analysis unit 18; a dialog strategy unit 19; a sentence generation unit 20; and a speech synthesis unit 21.

In the following, the processing units from the speech recognition unit 11 to the speech synthesis unit 21 will be generally referred to as "analysis processing units".

The analysis processing units 11 to 21, as illustrated in FIG. 2, are provided in each analysis unit that performs an analysis on a part of a sentence as a unit of analysis.

The analysis processing units 11 to 21 perform analysis processing while mutually exchanging the analysis results.

Each of the analysis processing units 11 to 21, during the respective analysis processing, calculates a value indicating the confidence degree of the analysis result. If the confidence degree calculated by each of the analysis processing units 11 to 21 is so low as to fail to satisfy a condition set in advance, it is determined that the analysis processing has failed, and processing for returning to the analysis of the previous sentence unit is performed. An example of the condition for determining the confidence degree will be described later.

The analysis processing performed by each of the analysis processing units 11 to 21 in the dialog processing unit 10 will be described.

The speech recognition unit 11 is supplied with speech waveform data of speech inputted into the speech input unit 1, and performs processing of recognizing a phoneme from the speech waveform data. The phoneme recognized by the speech recognition unit 11 may include vowels, consonants and the like. For phoneme recognition, estimation results from the analysis units other than the speech waveform may be used. The comprehensive use of the estimation results from all of the other analysis units may also apply to the other determination units described below.

The backchanneling/interruption determination unit 12 performs processing of determining the timing for backchanneling with a dialog sentence, or the timing for interrupting with a dialog sentence, at the end of a recognized sentence or during a temporary pause in speech, for example.

The non-verbal information unit 13 processing information of sound that cannot be expressed verbally. The information of sound that cannot be expressed verbally includes, for example, information of intonation, accent, rising intonation, and tone; and information of short sound and long sound. The information may also include non-speech information, such as a gesture and expressions. By using the information analyzed and processed by the non-verbal information unit 13, when a rising intonation is identified, for example, it becomes possible to determine that the recognized sentence is an interrogative sentence.

The morpheme analysis unit 14 performs processing of determining a boundary of recognized phonemes, and dividing the phonemes into individual words.

The part-of-speech analysis unit 15 performs processing of analyzing the part of speech of the words determined by the morpheme analysis unit 14. By the analysis in the part-of-speech analysis unit 15, the parts of speech, such as verb, noun, particle, and conjunction are discriminated.

The syntax analysis unit 16 analyzes the dependency structure of the parts of speech analyzed by the part-of-speech analysis unit 15.

The predicate argument/case analysis unit 17 analyzes the semantic role between words, such as the subject-predicate relationship of the words, based on the result of dependency structure analysis.

The anaphoric relation analysis unit 18 analyzes a pronoun relationship.

The dialog strategy unit 19 performs processing of determining a strategy for dialog with a speaker, based on the content of the analyzed sentence. For example, based on the result of sentence analysis, analysis processing for determining a dialog strategy, such as counterargument, consent, and topic guidance, is performed. When the dialog strategy is determined, a database and the like suitable for the intended use and the like of the system in which the natural language processing apparatus of the present example is applied may be prepared, and the dialog strategy may be determined by referring to the database.

The sentence generation unit 20 generates a sentence based on the dialog strategy in the dialog strategy unit 19. The sentence generation unit 20 internally and independently executes the content executed by the analysis unit, and computes a confidence degree for generating a sentence which is more appropriate in terms of meaning and syntax. Specifically, as illustrated in FIG. 2, the sentence generation unit 20 performs processing for generating an appropriate sentence by means of processing units for generating an appropriate sentence, including a non-verbal information unit 20a; a morpheme analysis unit 20b; a part-of-speech analysis unit 20c; a syntax analysis unit 20d; a predicate argument/case analysis unit 20e; and an anaphoric relation analysis unit 20f. The analysis processing units 20a to 20d including the non-verbal information unit 20a that are prepared may be the same as the analysis processing units 13 to 18 described above, including the non-verbal information unit 13.

The speech synthesis unit 21 obtains speech data by performing, at an appropriate timing, a speech synthesis processing on the sentence generated by the sentence generation unit 20. The speech data generated by the speech synthesis unit 21 are supplied to the speech output unit 3 (FIG. 1) and outputted in speech form. The sentence (text data) generated by the sentence generation unit 20 is supplied to the text output unit (FIG. 1) and outputted as text data.

The analysis processing performed by the analysis processing units 11 to 21 in the dialog processing unit 10 illustrated in FIG. 2 is performed with reference to the data stored in the database 5 illustrated in FIG. 1. Each of the analysis processing units 11 to 21 performs processing for obtaining one state as an analysis result. That is, each of the analysis processing units 11 to 21 obtains a single analysis result. In addition, each of the analysis processing units 11 to 21, when obtaining the single analysis result, calculates the confidence degree indicating the confidence of the single analysis result.

The single analysis result obtained by each of the analysis processing units 11 to 21 is reported to all of the analysis processing units 11 to 21 in the dialog processing unit 10. That is, as illustrated in FIG. 2, every time a part of the sentence is inputted, the analysis processing units 11 to 21 are formed incrementally from the first-stage analysis unit, the second-stage analysis unit, and so on, and the analysis processing is performed by the analysis processing units 11 to 21 in parallel.

Each of the analysis processing units 11 to 21, when performing the analysis processing in parallel, utilizes the analysis results obtained by the analysis processing unit and the other analysis processing units in the previous stage. In this case, each of the analysis processing units 11 to 21 also acquires the calculated confidence degree.

Figure 3:
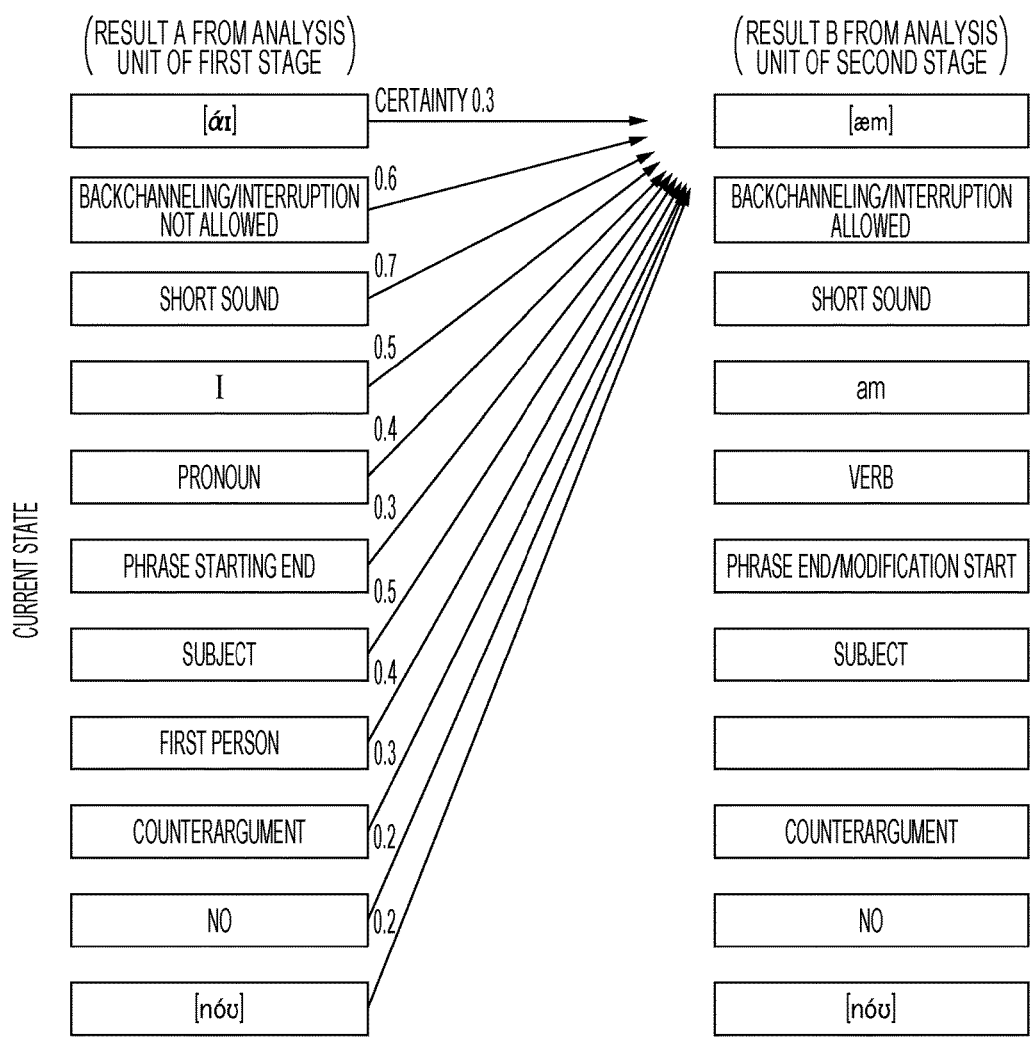
FIG. 3 is an explanatory diagram illustrating an example of a confidence degree acquired from each analysis processing unit according to an embodiment of the present invention.

FIG. 3 illustrates an example of the state in which the value of the confidence degree obtained by each of the analysis processing units 11 to 21 is reported to the analysis result unit of the next stage. In the example of FIG. 3, the values of the confidence degrees of the first-stage analysis results A obtained by all of the analysis processing units 11 to 21 are reported to the speech recognition unit 11 of the next stage. With respect to the other second-stage analysis processing units 12 to 21, the values of the confidence degrees of the results A are similarly supplied from all of the analysis processing units 11 to 21.

In the present example, the values of the confidence degrees are values between "0" to "1", where "1" corresponds to the highest confidence degree, and "0" corresponds to the lowest confidence degree.

In this way, each of the analysis processing units 11 to 21 performs analysis processing on the input data with reference to the analysis results and confidence degrees by the other analysis processing units of the previous stage. Each of the analysis processing units 11 to 21, when performing the respective analysis processing, performs an estimation processing for predicting the next input data, uses the data predicted by the estimation processing and an estimation confidence degree. The details of the state in which the analysis processing is performed by each of the analysis processing units 11 to 21 will be described later in specific examples with reference to FIG. 2 and FIG. 3.

Herein, each of the analysis processing units 11 to 21 is adapted to obtain a single analysis result. In the natural language processing apparatus of the present example, it is most preferable to thus limit the analysis result to a single one. However, the natural language processing apparatus may be adapted to obtain a limited number of analysis results, such as the upper two analysis results.

3. Example of State in which Each Analysis Processing Unit Performs Analysis Processing With reference to FIG. 2 to FIG. 5, an example in which each of the analysis processing units 11 to 21 performs analysis processing in an incremental and parallel manner will be described. The example indicating the analysis results A and B of the respective stages is described to facilitate an understanding of the recognition processing, and the actual speech or sentence analysis processing may be performed in a more detailed manner. Herein, the example relates to the case of speech input. In the case of text input, the speech recognition processing is not performed. Further, when the output is text and not speech, the speech synthesis processing is not performed, either.

FIG. 2 illustrates an example in which, in the analysis result A generated in the first stage, the speech recognition unit 11 recognizes the phonemes of [watashi], and in the analysis result B generated in the second stage, the speech recognition unit 11 recognizes the phonemes of [ga].

When the speech recognition unit 11 recognized, as the first-stage analysis result A, the last phoneme [i] of [watashi], the backchanneling/interruption determination unit 12 recognizes that the last phoneme [i] of [watashi] is in the middle of an utterance with respect to backchanneling and interruption, and determines that the state is [backchanneling/interruption not allowed] where backchanneling or interruption cannot be made.

The non-verbal information unit 13 makes a determination of [short sound]; the morpheme analysis unit 14 makes a determination of [I]; and the part-of-speech analysis unit 15 makes a determination of [pronoun].

The syntax analysis unit 16 makes a determination of [phrase starting end]; the predicate argument/case analysis unit 17 makes a determination of [subject; case indefinite]; and the anaphoric relation analysis unit 18 makes a determination of [first person]. Further, the dialog strategy unit 19 makes a determination for [counterargument] as a dialog strategy; the sentence generation unit 20 generates [not] as a dialog sentence for the counterargument; and the speech synthesis unit 21 obtains speech data for the pronunciation of [iya ("no")].

Thus, each of the first-stage analysis processing units 11 to 21 provides one analysis result A, as illustrated in FIG. 2.

In the second-stage analysis processing units 11 to 21, the analysis results A from all of the first-stage analysis processing units 11 to 21 are acquired and analysis processing is performed.

When the speech recognition unit 11 recognized the phonemes of [ga] as the second-stage result B, the backchanneling/interruption determination unit 12 recognizes that [ga] indicates a separation in utterance with respect to backchanneling/interruption, and makes a determination of [backchanneling/interruption allowed] indicating a state in which backchanneling or interruption can be made.

The non-verbal information unit 13 makes a determination of [short sound]; the morpheme analysis unit 14 makes a determination of [ga (Japanese hiragana character)]; and the part-of-speech analysis unit 15 makes a determination of [particle]. Also, the syntax analysis unit 16 makes a determination of [phrase end/dependency start]; and the predicate argument/case analysis unit 17 makes a determination of

[subject ga-case]. The anaphoric relation analysis unit 18 is in the state of no determination.

Further, the dialog strategy unit 19 makes a determination for making [counterargument] as a dialog strategy. The sentence generation unit 20 and the speech synthesis unit 21 continue with the determinations in the analysis results A of the previous stage. That is, the sentence generation unit 20 generates [not] as a dialog sentence for the counterargument, and the speech synthesis unit 21 obtains speech data for the pronunciation of [iya]. The dialog strategy in the analysis results A, B and the dialog sentence based on the dialog strategy are merely examples.

In this way, each of the analysis processing units 11 to 21, every time an analyzable unit of phonemes is inputted, generates a dialog sentence corresponding to the input speech and outputs the dialog sentence at appropriate timing, while performing analysis processing incrementally and in parallel in a real-time manner.

When it is possible to perform estimation for predicting a phoneme following the inputted phoneme, each of the analysis processing units 11 to 21 performs the analysis processing using the result predicted by the estimation.

For example, in the case of the first-stage dialog strategy unit 19, even when it is difficult for the dialog strategy unit 19 to implement a dialog strategy only on the basis of the input phoneme [watashi: I] recognized by the speech recognition unit 11, it may be possible for the dialog strategy unit 19 to derive, from an estimation for predicting the word following [I] in the morpheme analysis unit 14, the analysis result of [counterargument]. However, the analysis result may totally differ depending on the prediction situation of estimation, and the confidence degree indicating the confidence of analysis result may have a low value in the case of a pattern having a low frequency of appearance during the training of the database.

During the processing of estimation in each of the analysis processing units 11 to 21, the data accumulated in the database 5 are referenced, for example. That is, in the database 5, the input situation and the like of the past natural language sentences are accumulated, and the dialog strategy unit 19 performs the estimation processing with reference to a past input sentence, such as [watashi ga . . . ].

Figure 4:
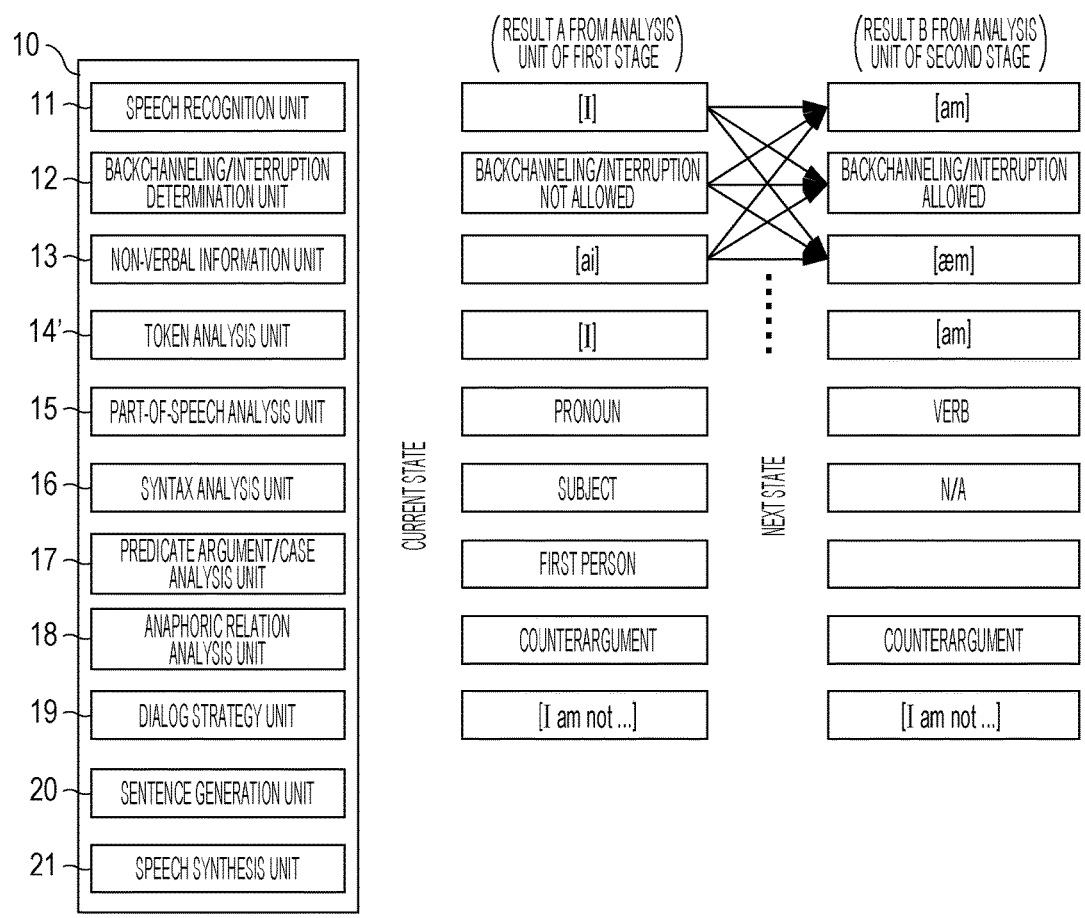
FIG. 4 is a configuration diagram illustrating an example of processing (example of English) in the incremental analysis unit according to an embodiment of the present invention.

FIG. 4 illustrates an example in which an English natural language sentence is inputted. When an English natural language sentence is processed, a token analysis unit 14' illustrated in FIG. 4 is prepared, instead of the morpheme analysis unit 14 illustrated in FIG. 2.

In the example of FIG. 4, in the analysis result A generated in the first stage, the speech recognition unit 11 recognizes the phonemes of [I], and in the analysis result B recognized in the second stage, the speech recognition unit 11 recognizes the phonemes of [am].

In the first-stage analysis result A, when the speech recognition unit 11 has recognized the phonemes [ai] (pronunciation symbol) of the [I], the backchanneling/interruption determination unit 12 recognizes that the input word [I] corresponding to the phonemes [ai] is in a grammatically intermediate state, and makes a determination of [backchanneling/interruption not allowed] indicating a state in which neither backchanneling nor interruption can be made.

The morpheme analysis unit 14 makes a determination of [I](watashi), and the part-of-speech analysis unit 15 makes a determination of [pronoun].

The syntax analysis unit 16 makes a determination of [subject], and the anaphoric relation analysis unit 18 makes a determination of [first person]. In addition, the dialog strategy unit 19 makes a determination for making [counterargument] as a dialog strategy; the sentence generation unit 20 generates [I am not . . . ] as a dialog sentence for the counterargument; and the speech synthesis unit 21 obtains speech data for the pronunciation of [I am not . . . ]. What sentence will follow the [not] is determined by the immediately preceding speech input, or the past dialog history.

In this way, in each of the first-stage analysis processing units 11 to 21, one analysis result A is obtained. However, the one analysis result being obtained in each of the first-stage analysis processing units 11 to 21 is merely an example, and a plurality of candidates (a plurality of candidates with confidence degrees, as will be described later) may be obtained.

The second-stage analysis processing units 11 to 21 acquire the analysis results A from all of the first-stage analysis processing units 11 to 21, and perform analysis processing.

If the speech recognition unit 11 recognized, as the second-stage result B, the phonemes [aem] (pronunciation symbol, where "ae" is a single pronunciation symbol, as illustrated in FIG. 4) of [am], the backchanneling/interruption determination unit 12 recognizes that the input words [I am] indicate a separation in utterance, and makes a determination of [backchanneling/interruption allowed], indicating a state in which backchanneling or interruption can be made.

The morpheme analysis unit 14 makes a determination of [am], and the part-of-speech analysis unit 15 makes a determination of [verb].

Then, the dialog strategy unit 19 makes a determination for making [counterargument] as a dialog strategy. The sentence generation unit 20 and the speech synthesis unit 21 continue the determination of the analysis results A of the previous stage. That is, the sentence generation unit 20 continues the generation of [I am not . . . ] as a dialog sentence for the counterargument, and the speech synthesis unit 21 obtains speech data for the pronunciation of [I am not . . . ]. In the case of FIG. 4, too, the dialog strategy in the analysis results A, B and the dialog sentence based on the dialog strategy are examples.

Thus, the analysis processing units 11 to 21 of the present embodiment can handle various languages.

4. Example of State in which Analysis Processing is Performed in Parallel

Figure 5:
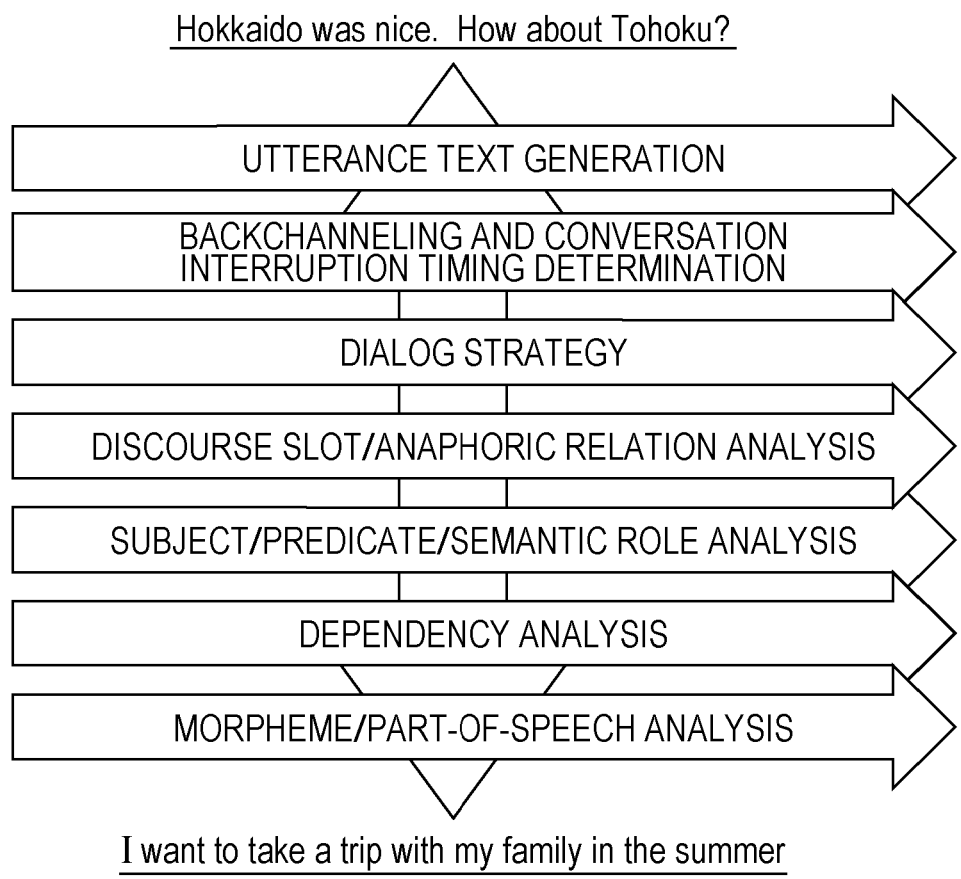
FIG. 5 is an explanatory diagram illustrating an example of parallel processing in the incremental analysis unit according to an embodiment of the present invention.

FIG. 5 illustrates an example of a state in which the analysis processing in the analysis processing units 11 to 21 are performed in parallel. In the example illustrated in FIG. 5, the natural language sentence at the bottom "I want to take a trip with my family in the summer" is made as a speech input, and, based on an analysis result, the natural language sentence at the top "Hokkaido was nice. How about Tohoku?" is outputted as a dialog sentence.

As illustrated in FIG. 5, in response to the speech input, each of the analysis processing units 11 to 21 perform processing based on the inputted phonemes, such as morpheme/part of speech analysis, modification analysis, subject/predicate/semantic role analysis, discourse slot/anaphoric relation analysis, intention/conversation flow strategy, backchanneling and conversation interruption timing determination, and utterance text generation, incrementally while mutually exchanging information and making estimations. In the discourse slot in FIG. 5, a focus indicating the topic of conversation, nouns corresponding to the roles of subjective case, objective case and the like, and verbs connecting the nouns are retained and updated as the conversation proceeds. With respect to the anaphoric relation, a processing of solving the referencing of pronouns and demonstratives is performed. These analysis processing is performed in the anaphoric relation analysis unit 18 illustrated in FIG. 2.

The configurations of the analysis processing units have been described for facilitating a proper understanding with Japanese language in mind, and the analysis units that are to be prepared may vary. For example, processing of idioms or idiomatic phrases may be contemplated. In addition, the configurations may be applied not only to Japanese language but also to any natural language.

5. Detailed Example of Processing in Each Analysis Processing Unit

Figure 6:
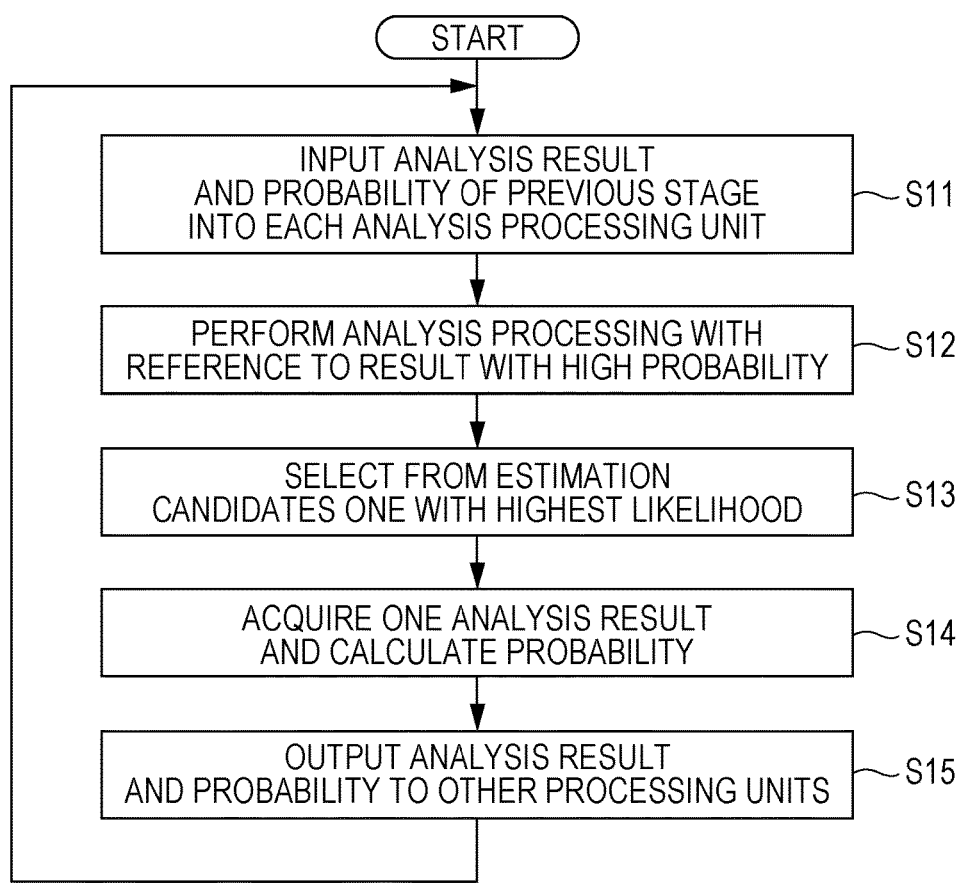
FIG. 6 is a flowchart illustrating an example of a processing procedure in each analysis processing unit according to an embodiment of the present invention.

FIG. 6 is a flowchart illustrating an example of a procedure for performing analysis processing in each of the analysis processing units 11 to 21.

First, to each of the analysis processing units 11 to 21, the analysis result and confidence degree are inputted from all of the analysis processing units 11 to 21 of the analysis units of the previous stage (step S11). For example, when the second-stage analysis processing units 11 to 21 perform analysis, the analysis results A and confidence degree of the previous stage are inputted.

Then, each of the analysis processing units 11 to 21 performs analysis processing with respect to the input data by referring to the processing results with the attached confidence degrees taken together (step S12).

Each of the analysis processing units 11 to 21 then selects from the estimation candidates one with the highest likelihood under the current situation, and finalizes the selected candidate for estimation (step S13).

Each of the analysis processing units 11 to 21, after selecting the estimation in step S13, obtains one new analysis result using the current input data, estimated data, and the analysis result of the previous stage. Each of the analysis processing units 11 to 21 also calculates a confidence degree indicating the confidence of analysis result (step S14).

Each of the analysis processing units 11 to 21 then reports the analysis result and confidence degree obtained in step S15 to all of the analysis processing units 11 to 21 of the next stage analysis units (step S15).

Each of the analysis processing units 11 to 21, upon the input of the next unit of phoneme data, returns to the processing of step S11, and performs the analysis processing of the next stage.

In the flowchart of FIG. 6, each of the analysis processing units 11 to 21 obtains the analysis result and confidence degree from the immediately preceding (previous stage) analysis processing units 11 to 21. When there is an earlier analysis unit, the analysis result and confidence degree may also be obtained from each of the past analysis processing units 11 to 21 of two or three stage prior. Depending on the analysis situation, the analysis result or confidence degree of the immediately preceding analysis processing units 11 to 21 may not be referenced, and instead only the analysis result of the analysis processing units 11 to 21 of the previous stage may be referenced.

As described with reference to the flowchart of FIG. 6, in the natural language processing apparatus of the present example, estimation is performed by all of the analysis processing units 11 to 21, thereby enabling an appropriate analysis processing.

That is, when an incremental processing is performed in a real-time manner as in the present example, i.e., when the goal is a natural processing such as a human thinking about a dialog response sentence in his or her head, the estimation processing is important. In the actual language processing performed by the human, responses are made at the timing that would be impossible unless estimation is made. That is, it is necessary to perform estimation constantly and estimate and finalize a state.

The reason is that at the point in time of making an estimation, i.e., up to the current time, the input state is finalized. Thus, if the estimated prediction is wrong, it is necessary to reset the current state and start all over from the state prior to the resetting, as will be described later. That is, starting from the state prior to the wrong prediction, the state of the next stage is computed in accordance with the subsequent input. Such operation is also similar to the processing of language by humans, and is one of the necessary elements for achieving a human-like natural processing.

While the number of steps of estimation has been described as being one, the number of steps may be two or more.

6. Example of Performing Reanalysis

Figure 7:
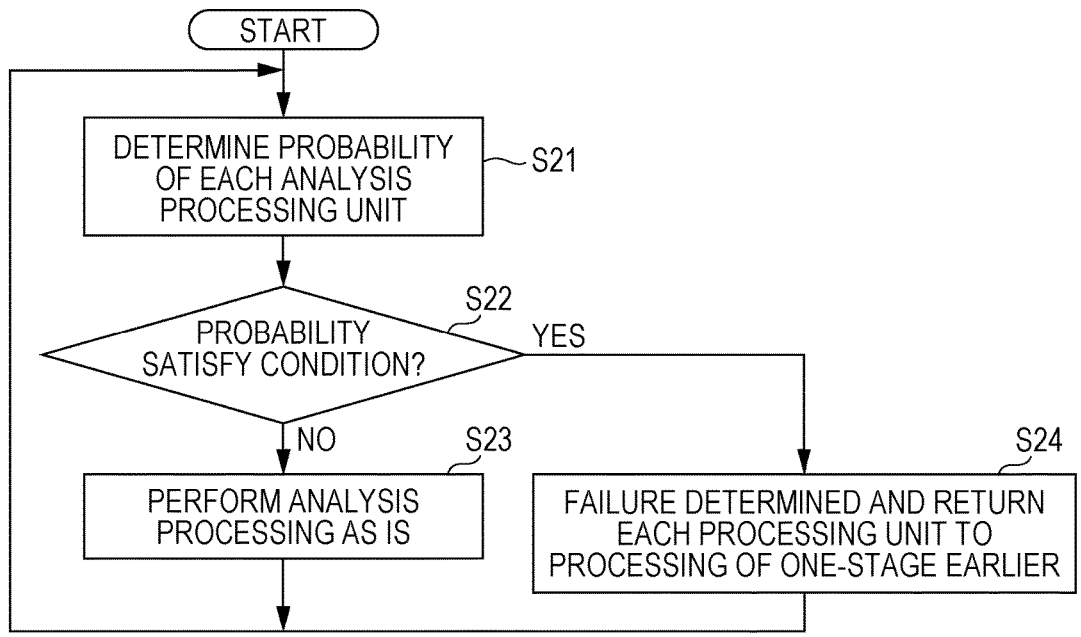
FIG. 7 is a flowchart illustrating an example of a determination processing in a case where a reanalysis is performed according to an embodiment of the present invention.

FIG. 7 is a flowchart illustrating an example of determination processing in a case where reanalysis is performed.

Reanalysis determination is made by a control unit (not illustrated) which controls the analysis operation of the dialog processing unit 10 as a whole.

The control unit of the dialog processing unit 10 acquires the values of the confidence degrees calculated by each of the analysis processing units 11 to 21 in each stage, and performs determination processing (step S21). The control unit then determines if the value of the confidence degree of each of the analysis processing units 11 to 21 satisfies a failure determination condition set in advance (step S22).

One example of the determination as to whether the value of the confidence degree satisfies the condition set in advance is the processing to determine whether an average value of the values of the confidence degrees is not more than a threshold value. When the average value is determined, it is preferable to weight the respective analysis processing in accordance with importance and the like. The use of average value is merely an example, and whether the value of the confidence degree is appropriate or not may be determined in accordance with a condition determined for the respective analysis processing.

If the failure determination condition is not satisfied by the determination of step S22, the control unit allows each of the analysis processing units 11 to 21 to keep performing the analysis processing as is (step S23).

If it is determined in step S22 that the value of the confidence degree satisfies the failure determination condition, the control unit makes a determination that the current analysis processing has been a failure, returns each of the analysis processing units 11 to 21 to the processing of one-stage earlier, and causes each of the analysis processing units 11 to 21 to perform the analysis processing of one-stage earlier (step S24).

For example, at the end of the analysis by the second-stage analysis unit illustrated in FIG. 2, if the value of the confidence degree obtained by the second-stage analysis unit is a low value that satisfies a condition determined in advance, the dialog processing unit 10 is returned to the point in time of the end of analysis by the first-stage analysis unit, and performs the analysis in the second-stage analysis unit again.

When returning to the processing of one-stage earlier in step S24, each of the analysis processing units 11 to 21 changes conditions and the like for analysis processing so that the same analysis result would not be generated. While the example of returning to the processing of one-stage earlier has been described, the processing units may be returned to the processing of two stages earlier.

After the processing in step S23, S24, the control unit of the dialog processing unit 10 returns to the determination of step S21, and performs determination processing for the confidence degree in the next stage.

7. Example of the Course of Execution of Analysis Processing

Figure 8:
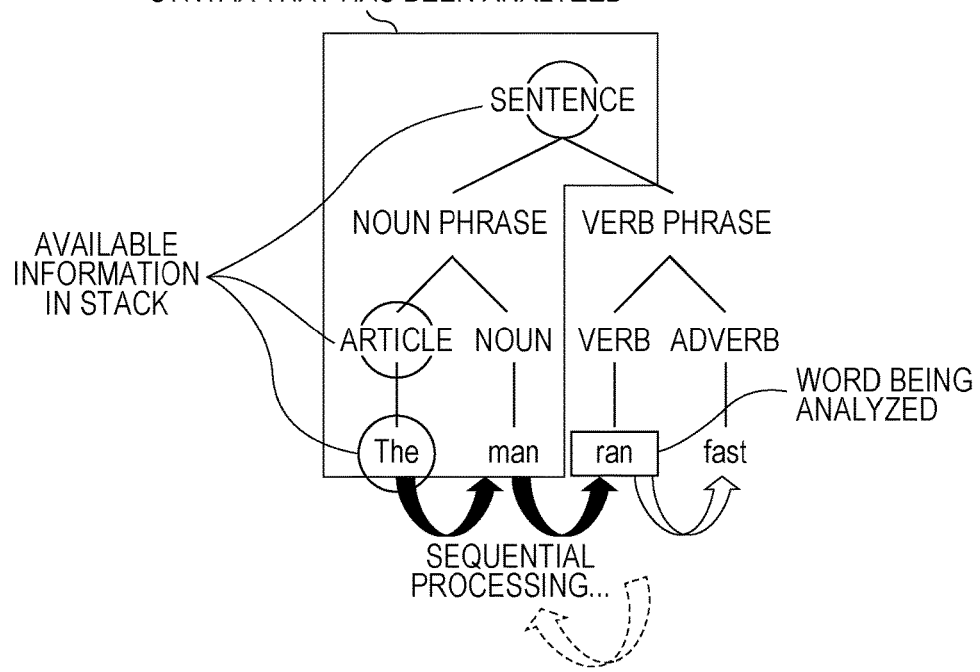
FIG. 8 is an explanatory diagram illustrating an example in the course of execution of analysis processing according to an embodiment of the present invention.

FIG. 8 is an explanatory diagram illustrating a situation in the course of execution of analysis processing in the dialog processing unit 10.

In the present example, the speech input unit 1 or the text input unit 2 receives an English speech input or text input of "The man ran fast . . . ".

For example, in the initial stage of analysis, "The" is determined to be an article; in the next stage of analysis, "man" is analyzed to be a noun; and "The man" is determined to be a noun phrase in the sentence. This is the syntax that has been analyzed in FIG. 7.

When "The man" has been analyzed, "ran" is the word being analyzed in the next stage. During the analysis of "ran", the analyzed information, such as enclosed by a rectangle in FIG. 8, is utilized. In the analysis processing unit, among the analyzed information, only the information necessary for the subsequent processing is retained as a state. For example, as enclosed by circles in FIG. 8, the information of the analyzed word "The", the information of article, and the information of sentence are retained. Using the retained information, analysis processing is performed, and "ran" is determined to be a verb. The information enclosed in the circles correspond to information stored in a stack memory of the analysis processing unit, and the analysis processing is performed only with reference to the limited information stored in the stack memory. The stack memory may have a restriction such that a plurality of the same type of information cannot be simultaneously retained. By adding such restriction, the analyzed information referenced by the analysis processing unit for analysis is limited to the limited information. The restriction similarly exists in humans as a limit to the number of times of embedded structure during embedded structure processing.

In this way, analysis processing is performed incrementally one stage at a time. During the analysis processing in each stage, if an erroneous analysis result is obtained, the dialog processing unit 10 of the present example returns to the processing of at least one-stage earlier. For example, if, during the analysis processing for "ran", the control unit of the dialog processing unit 10 determines that the confidence degree is low and the analysis is erroneous, the dialog processing unit 10 returns to the analysis processing of at least one-stage earlier for "man". Alternatively, depending on the situation, the dialog processing unit 10 may return to the analysis processing of two stages earlier for "The". Such return operations are also similar to the back-tracking in humans.

In the example of FIG. 8, mainly the utilization of the analyzed syntax by the sentence being analyzed has been described. However, as already described with reference to the flowchart of FIG. 6, for example, when the respective analysis processing is performed, each analysis unit performs estimation processing of the state of the analysis unit, and utilizes the result of estimation by the estimation processing. The state that each analysis unit has differs depending on the object to be analyzed.

8. Example of Speech Output Based on Recognition Result

Figure 9:
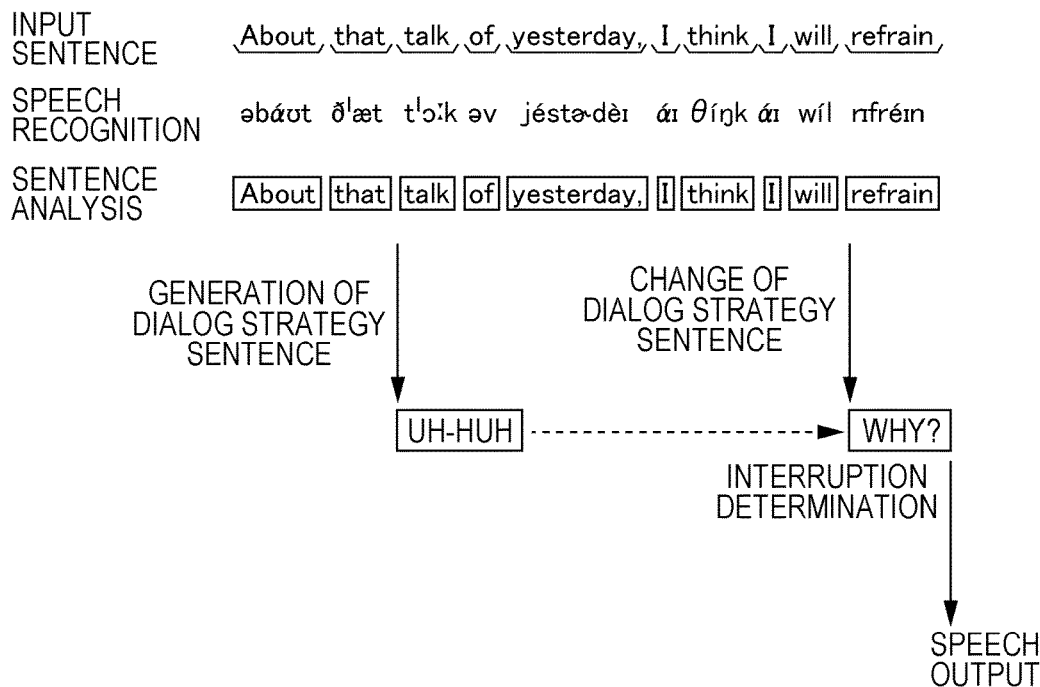
FIG. 9 is an explanatory diagram illustrating an example of processing (Example 1) for analyzing a natural language sentence and outputting a dialog sentence according to an embodiment of the present invention.
Figure 10:
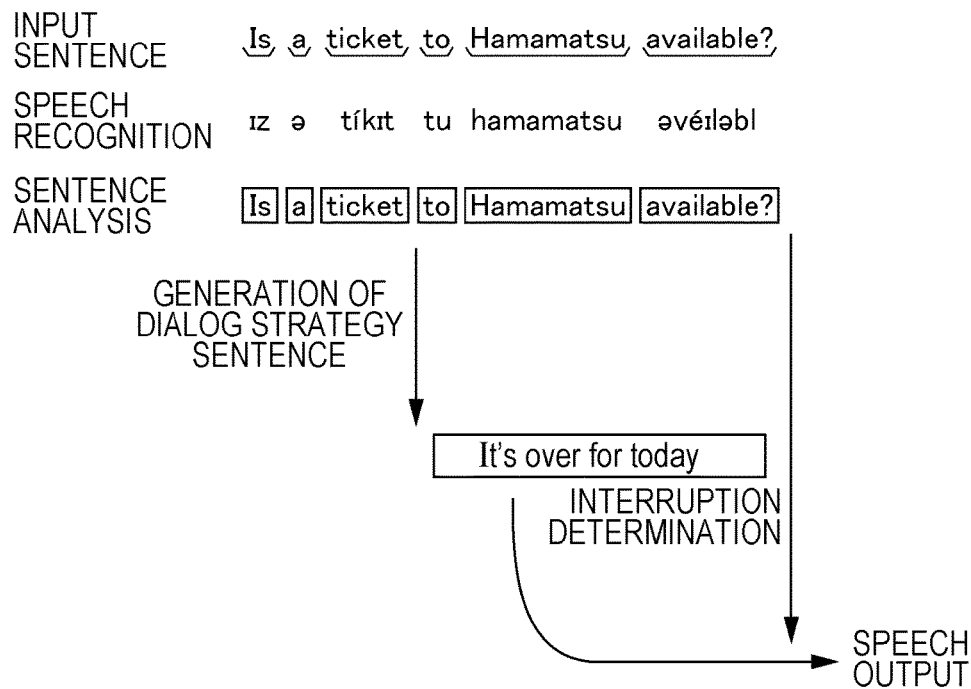
FIG. 10 is an explanatory diagram illustrating an example of processing (Example 2) for analyzing a natural language sentence and outputting a dialog sentence according to an embodiment of the present invention.

FIG. 9 and FIG. 10 illustrate Example 1 and Example 2 in which, based on the recognition result from the dialog processing unit 10, the speech output unit 3 of FIG. 1 outputs speech.

In Example 1 illustrated in FIG. 9, the speech input unit 1 receives the input of a Japanese language passage "About that talk of yesterday, I think I will refrain".

In this case, by the recognition of phonemes in the speech recognition unit 11, the phonemes of "əbάʊt ð'æt t'ɔːk əv jéstɚdèɪ άɪ θíŋk άɪ wil rɪfréɪn" are obtained. Further, by the passage analyses by the morpheme analysis unit 14 and the part-of-speech analysis unit 15, for example, the words, phrases, or states of "about", "that", "talk", "of", "yesterday", "I", "think", "I", "will", "refrain" are recognized.

In this case, the dialog strategy unit 19 of the dialog processing unit 10, at the point in time of recognition of "of yesterday", for example, makes a determination by estimation processing that the likelihood is high that the talk will positively continue, and causes the sentence generation unit 20 to create a backchanneling sentence "un-un (uh-huh)". However, at the point in time of recognition "of yesterday", the backchanneling/interruption determination unit 12 makes a determination of [backchanneling/interruption not allowed], and the state in which the sentence of "un-un" is not outputted from the speech output unit 3 continues.

Then, at the stage in which "will refrain" is analyzed by the passage analysis by the morpheme analysis unit 14 and the part-of-speech analysis unit 15, for example, the dialog strategy unit 19 determines to change dialog strategy with respect to the determination so far that the talk will positively continue. For example, the dialog strategy unit 19 creates a sentence for asking the question "Why?" in the sentence generation unit 20. Then, when the backchanneling/interruption determination unit 12 has made the determination of [backchanneling/interruption allowed] based on "think", the sentence of "Why?" is outputted from the speech output unit 3. Also, as necessary, a text sentence of "Why?" is outputted from the text output unit 4.

In Example 2 illustrated in FIG. 10, the speech input unit 1 receives the input of a Japanese language passage "Is a ticket to Hamamatsu available?".

In this case, by the phoneme recognition by the speech recognition unit 11, the phonemes of "ɪz ə tíkɪt tu hamamatsu əvéɪləbl" are obtained. Further, by the passage analysis by the morpheme analysis unit 14 and the part-of-speech analysis unit 15, for example, the words, phrases, or states of "is", "a", "ticket", "to", "Hamamatsu", "available?" are recognized.

In this case, the dialog strategy unit 19 of the dialog processing unit 10, at the point in time of recognition of "to Hamamatsu", for example, makes a determination by estimation processing that the likelihood is high of a question being made as to how to get to Hamamatsu, and, recognizing that the current time is later than the departure of the final train bound for Hamamatsu, causes the sentence generation unit 20 to create a sentence "It's over for today". However, at the point in time of the creation of the sentence, the backchanneling/interruption determination unit 12 determines that the state is [backchanneling/interruption not allowed] indicating that backchanneling or interruption cannot be made, and the sentence created by the sentence generation unit 20 is not outputted from the speech output unit 3.

Then, at the point in time of the input of the one entire sentence "Is a ticket to Hamamatsu available?" as the passage inputted to the speech input unit 11, the backchanneling/interruption determination unit 12 detects sentence separation and determines [backchanneling/interruption allowed]. In this case, the sentence created by the sentence generation unit 20 "It's over for today" is synthesized by the speech synthesis unit 21 and outputted via the speech output unit 3. Also, as necessary, a text sentence of "It's over for today" is outputted from the text output unit 4.

It should be noted, however, that the situation in which the sentence created by the sentence generation unit 20 is outputted from the speech output unit 3 is when the dialog strategy obtained at the point in time of recognition of "to Hamamatsu" is ongoing. When the dialog strategy is changed as the sentence recognition proceeds, a sentence based on the dialog strategy after the change is finally outputted. The situation in which, as illustrated in FIG. 10, the dialog sentence is outputted after detecting the input of one sentence to a point that can be considered a separation is also merely an example. Depending on the situation of recognition of the input sentence, a dialog sentence may be outputted if it is determined that backchanneling or interruption can be made in the middle of the input sentence.

9. Effects of Natural Language Processing Apparatus of the Embodiment of the Present Invention In the prior researches on natural language processing, various theories have been presented by a number of researchers. The theories presented include various mutually incompatible theories with respect to the rules of syntax, among others.

The use of mutually incompatible theories between individuals, such as the use of incompatible rules of syntax, means that, due to the incompatibility, the communication will fail with regard to incompatible portions. The conventional researches, due to such incompatibility, are different from human processing, and may have actually hampered the achievement of natural human-like conversation.

In contrast, according to the embodiment of the present invention, restrictions are provided by simultaneously taking the various analysis unit levels into consideration, so that the unitary rules that the humans possess can be simultaneously defined at the various analysis unit levels. Accordingly, the embodiment improves analysis processing capability and contributes to achieving more human-like natural conversation.

That is, in the natural language processing apparatus according to the embodiment of the present invention, every time an analyzable unit of a part of a natural language sentence is inputted, analysis processing is performed in an incremental and parallel manner in analysis processing units prepared for each element of analysis, and each processing unit performs processing to obtain a single analysis result. Based on the analysis results, a final dialog sentence is outputted.

Such processing in which the input sentence is analyzed to generate a dialog sentence is similar to the processing in the case in which humans have a conversation while thinking. That is, when humans have a dialog, they perform processing in which individual words are incrementally discriminated from speech that has been heard, and, while making predictions based on the discriminated words and sentences as to what the other person is talking about (i.e., making future estimations to some extent), a dialog sentence is uttered based on the prediction when the situation allows for backchanneling or interruption.

In the natural language processing apparatus of the present example, processing similar to the situation in which human have a dialog while thinking is performed and an appropriate dialog sentence is outputted, enabling the natural language processing apparatus to have a satisfactory dialog with a human.

In addition, each of the analysis processing units 11 to 21 in the dialog processing unit 10 performs the analysis processing and makes an estimation after acquiring the analysis result of the previous stage by each analysis processing unit or the other analysis processing units. Accordingly, the analysis processing can be performed with respect to narrowed candidates. Thus, compared with most of the conventional techniques whereby a very large number of candidates are computed and retained, it is possible to perform analysis using a drastically reduced amount of computing process, with the advantage that the analysis processing units 11 to 21 do not require processing units with extremely high computing capability. However, it goes without saying that the analysis processing units 11 to 21 may utilize high computing capability.

In the natural language processing apparatus of the present example, an optimum analysis result is obtained in a real-time manner by making an estimation every time individual words are analyzed, while referencing the other analysis results in the situation. Accordingly, even before the speaker finishes a passage, a dialog strategy can be determined at the particular point in time, and a dialog sentence based on the dialog strategy is prepared. Even if the input contained a slip of the tongue or an unrecognizable phoneme or word, they are compensated for by prediction with an optimum replacement. Thus, even during an apparently distracted conversation in which a speaker's passage is grammatically wrong or the contents being talked about vary one after another, an appropriate dialog can be maintained.

In the natural language processing apparatus of the present example, processing is performed in which a dialog sentence is predicted by estimation. Accordingly, the analysis result may become erroneous. However, even in actual conversations between humans, estimations or predictions made in the middle of the conversation often prove wrong. Thus, erroneous estimation does not present a problem for dialog processing, and may actually help to achieve a human-like natural conversation.

In case the estimations or predictions in the analysis processing units 11 to 21 are wrong, the analysis processing is quickly performed again by going back to a stage earlier than the current stage, thus making it possible to obtain an appropriate analysis result finally.

Accordingly, the natural language processing apparatus of the present example makes it possible to have a natural conversation with a computer in a manner similar to a conversation between humans.

The natural language processing apparatus of the embodiment has been described as being configured in hardware. It is also possible, however, to create a computer program for performing processing similar to the analysis processing by each of the analysis processing units 11 to 21 in the dialog processing unit 10, and to mount the computer program in a computer apparatus so that the computer apparatus can be caused to function as a natural language processing apparatus. In this case, the computer program may be recorded in a recording medium, such as various discs or semiconductor memory, and distributed to the computer apparatus. Alternatively, the computer program may be distributed to the computer apparatus via a transmission medium such as the internet.

DESCRIPTION OF REFERENCE SIGNS

1 Speech input unit
2 Text input unit
3 Speech output unit
4 Text output unit
5 Database
10 Dialog processing unit
11 Speech recognition unit
12 Backchanneling/interruption determination unit
13 Non-verbal information unit
14 Morpheme analysis unit
14', 14 Token analysis unit
15 Part-of-speech analysis unit
16 Syntax analysis unit
17 Predicate argument/case analysis unit
18 Anaphoric relation analysis unit
19 Dialog strategy unit
20 Sentence generation unit
21 Speech synthesis unit

The invention claimed is:

1. A natural language processing apparatus for analyzing an inputted natural language sentence and generating an output sentence for having a dialog with the inputted natural language sentence, the natural language processing apparatus comprising:
a dialog analyzing-and-generating unit in which a plurality of analysis processing units for performing a different analysis for each element of the natural language sentence are prepared, wherein every time an analyzable unit of the natural language sentence is inputted, each of the plurality of analysis processing units performs an analysis with respect to the input unit in an incremental and parallel manner; and
an output unit for obtaining an output based on an analysis result from each of the analysis processing units in the dialog analyzing-and-generating unit,
wherein:
each of the analysis processing units prepared in the dialog analyzing-and-generating unit is configured to acquire an immediately preceding or an earlier analysis result from the analysis processing unit and an immediately preceding or an earlier analysis result from another analysis processing unit, and configured to obtain one or a limited number of analysis results with reference to the acquired analysis results; and
based on the one or a limited number of analysis results from each of the analysis processing units in the dialog analyzing-and-generating unit, a sentence generation unit which is one of the analysis processing units generates a dialog response sentence corresponding to the inputted natural language sentence, and outputs the dialog response sentence to the output unit.

2. The natural language processing apparatus according to claim 1, wherein the output unit outputs the dialog response sentence in speech or text form.

3. The natural language processing apparatus according to claim 1, wherein each of the analysis processing units retains limited information necessary for analysis, and performs an analysis using the limited information.

4. The natural language processing apparatus according to claim 3, wherein, with respect to information that has been analyzed, the limited information is provided with a restriction to prevent retention of a plurality of items of a same type of information.

5. The natural language processing apparatus according to claim 1, wherein, when at least one of the analysis processing units obtains an analysis result, estimation is performed in each of the analysis processing units using data accumulated in a database to predict a next input data, a word, or a phrase that will come directly next is predicted using the estimated result, and one or a limited number of analysis results are obtained using the inputted natural language sentence and the predicted word, or phrase.

6. The natural language processing apparatus according to claim 1, wherein each of the analysis processing units in the dialog analyzing-and-generating unit calculates a confidence degree indicating a confidence of analysis result, and each of the analysis processing units reports the calculated confidence degree to all of the other analysis processing units.

7. The natural language processing apparatus according to claim 6, wherein each of the analysis processing units in the dialog analyzing-and-generating unit, if the calculated confidence degree is a low value not more than a threshold value that satisfies a predetermined condition, returns the processing of each of the analysis processing units to the analysis processing at an end point in time of the processing of at least one-stage earlier.

8. The natural language processing apparatus according to claim 1, wherein the analysis processing units as constituent elements of the dialog analyzing-and-generating unit include a morpheme analysis unit, a part-of-speech analysis unit, a syntax analysis unit, a predicate argument and case analysis unit, and an anaphoric relation analysis unit.

9. The natural language processing apparatus according to claim 8, wherein the analysis processing units as constituent elements of the dialog analyzing-and-generating unit further include a backchanneling and interruption determination unit and a non-verbal information unit.

10. A natural language processing method in a natural language processing apparatus for analyzing an inputted natural language sentence and generating an output sentence for having a dialog with the inputted natural language sentence, the natural language processing method comprising:
an incremental analysis step of preparing analysis processing units having functions for performing a plurality of analysis processes for performing a different analysis for each element of the natural language sentence (hereafter referred to as "analysis processing functions"), and,
every time an analyzable unit of the natural language sentence is inputted, performing an analysis in an incremental and parallel manner with respect to the input unit in each of the plurality of analysis processing units;
a sentence generation step of obtaining, based on each analysis result of the incremental analysis step in each of the analysis processing units, a dialog response sentence corresponding to the inputted natural language sentence in a sentence generation unit which is one of the analysis processing units; and
an output step of outputting the dialog response sentence generated in the sentence generation unit to an output unit,
wherein each of the analysis processing units is configured to acquire an immediately preceding or an earlier analysis result from the analysis processing unit and an immediately preceding or an earlier analysis result from another analysis processing unit, and configured to obtain one or a limited number of analysis results with reference to the acquired analysis results.

11. The natural language processing method according to claim 10, wherein the dialog response sentence outputted from the output unit is outputted in speech or text form.

12. The natural language processing method according to claim 10, wherein, during the analysis processing in each of the analysis processing units, limited information necessary for analysis is retained, and an analysis is performed using the limited information.

13. The natural language processing method according to claim 12, wherein, with respect to information that has been analyzed, the limited information is provided with a restriction to prevent retention of a plurality of items of a same type of information.

14. The natural language processing method according to claim 10, wherein, during the analysis processing in each of the analysis processing units, when at least one analysis processing function among the analysis processing functions of the analysis processing units obtains an analysis result, estimation is performed in each of the analysis processing units using data accumulated in a database to predict next input data, a word, or a phrase that will come directly next is predicted using the estimated result, and one or a limited number of analysis results are obtained using the inputted natural language sentence and the predicted word, or phrase.

15. The natural language processing method according to claim 10, wherein each analysis processing function in each of the analysis processing units calculates a confidence degree indicating a confidence of analysis result, and each analysis processing unit reports the calculated confidence degree to the analysis processing function of another analysis processing unit.

16. The natural language processing method according to claim 15, wherein each analysis processing function in each of the analysis processing units, if the calculated confidence degree is a low value not more than a threshold value that satisfies a predetermined condition, returns the processing in each of the analysis processing units to the analysis processing function at an end point in time of the processing of at least one-stage earlier.

* * * * *